US012791172B1

(12) United States Patent
Neal et al.

(10) Patent No.: US 12,791,172 B1
(45) Date of Patent: Nov. 10, 2026

(54) LIGHTING ASSEMBLY AND CHANDELIER

(71) Applicant: Tech Lighting LLC, Skokie, IL (US)

(72) Inventors: Charles B. Neal, Houston, TX (US); Newman Tsu-Hao Chen, Houston, TX (US)

(73) Assignee: Visual Comfort LLC, Skokie, IL (US)

( * ) Notice: Subject to any disclaimer, the term of this patent is extended or adjusted under 35 U.S.C. 154(b) by 0 days.

(21) Appl. No.: 19/395,268

(22) Filed: Nov. 20, 2025

(51) Int. Cl.

| | |
|---|---|
| ***F21V 21/008*** | (2006.01) |
| ***F21S 8/00*** | (2006.01) |
| ***F21S 8/06*** | (2006.01) |
| ***F21V 21/35*** | (2006.01) |
| ***F21V 23/06*** | (2006.01) |
| *F21Y 115/10* | (2016.01) |

(52) U.S. Cl.
CPC ............ *F21V 21/008* (2013.01); *F21S 8/038* (2013.01); *F21S 8/061* (2013.01); *F21V 21/35* (2013.01); *F21V 23/06* (2013.01); *F21S 8/066* (2013.01); *F21Y 2115/10* (2016.08)

(58) Field of Classification Search
CPC ........ F21V 21/008; F21V 21/35; F21V 23/06; F21S 8/038; F21S 8/061; F21S 8/066
See application file for complete search history.

(56) References Cited

U.S. PATENT DOCUMENTS 2,250,907 A 7/1941 Edwards
5,440,469 A * 8/1995 Gomes .................... F21V 23/02 362/648
5,584,576 A * 12/1996 Wei Hong .............. F21V 21/26 362/147
6,863,423 B2 3/2005 Stone et al.
8,807,780 B2 8/2014 Napier et al.
(Continued)

FOREIGN PATENT DOCUMENTS

DE 102012104969 A1 12/2013
EP 2952805 A1 12/2015

OTHER PUBLICATIONS

Vistosi OTO SP Rain Circular UL Retreived from the internet at <URL: https://www.lightology.com/img/prod/pdf/OTO%20SP%20R%20UL-combined-090123.pdf > (2025).

*Primary Examiner* — James R Greece
*Assistant Examiner* — Michael Chiang
(74) *Attorney, Agent, or Firm* — MARSHALL, GERSTEIN & BORUN LLP

(57) ABSTRACT

A lighting assembly includes a cable having a first conductive pathway and a second conductive pathway extending the length of the cable along its exterior surface. A luminaire is configured to slide along the length of the cable while maintaining electrical communication between an LED of the luminaire and the cable. The luminaire includes a conductive clip that electrically connects the first conductive pathway and the second conductive pathway and is configured to slide along the length of the cable. The conductive clip includes a projection extending outward from the cable through a tube that is connected to the conductive clip and positioned around the cable. The LED is positioned on the tube and connected to the projection of the conductive clip such that the LED in electrical communication with the first conductive pathway and the second conductive pathway via the conductive clip.

20 Claims, 5 Drawing Sheets

(56) References Cited

U.S. PATENT DOCUMENTS

| | | | | |
|---|---|---|---|---|
| 10,139,063 | B2 | 11/2018 | Kwast et al. | |
| 10,151,466 | B2 * | 12/2018 | Sonneman .............. | F21V 21/08 |
| 10,514,133 | B2 | 12/2019 | Sonneman et al. | |
| 11,320,122 | B2 | 5/2022 | Huang et al. | |
| 11,965,637 | B2 | 4/2024 | Yando | |
| 2004/0201997 | A1 * | 10/2004 | Chan .................. | A44C 15/0015 362/407 |
| 2007/0153516 | A1 * | 7/2007 | Lehman .................. | F21V 21/35 362/238 |
| 2025/0043945 | A1 * | 2/2025 | Illueca Bel ............... | F21S 8/06 |

* cited by examiner

LIGHTING ASSEMBLY AND CHANDELIER

FIELD OF THE DISCLOSURE

The present disclosure relates to chandeliers and, more particularly, to a lighting assembly having a slidable luminaire for use in a chandelier.

BACKGROUND

Chandeliers are decorative light fixtures that may be used to illuminate a room. Chandeliers are installed in varying environments having, for example, different ceiling heights, different lighting conditions, and different ambiances. Accordingly, a chandelier is preferably adjustable to enable the chandelier to be modified to best suit the environment in which it is installed. However, power is typically provided to the lights of a chandelier via wired connections, and the wired connections often limit the adjustability of the chandelier.

SUMMARY

In an arrangement, a lighting assembly includes a cable and a luminaire. The cable has a length, an exterior surface, a first conductive pathway extending the length of the cable along the exterior surface, a second conductive pathway extending the length of the cable along the exterior surface, and a non-conductive material electrically isolating the first conductive pathway from the second conductive pathway. The luminaire includes a conductive clip, a tube, an LED, and a housing. The conductive clip is secured at least partially around the exterior surface of the cable. The conductive clip electrically connects the first conductive pathway and the second conductive pathway and is configured to slide along the length of the cable. The conductive clip includes a projection extending outward from the cable. The tube is connected to the conductive clip and positioned around the cable, and the projection of the conductive clip extending through the tube. The LED is coupled to the tube and connected to the projection of the conductive clip. The LED is in electrical communication with the first conductive pathway and the second conductive pathway via the conductive clip. The housing is secured to the tube around the LED and the cable. The luminaire is configured to slide along the length of the cable while maintaining electrical communication between the LED and the cable.

In some forms, the tube may be non-conductive.

In some forms, the LED may be one of a plurality of LEDs provided on an LED sheet. The LED sheet may be arranged in a cylindrical configuration around the tube, and each of the plurality of LEDs may be in electrical communication with the first conductive pathway and the second conductive pathway.

In some forms, the conductive clip may be a lower conductive clip. The luminaire may further include an upper conductive clip secured at least partially around the exterior surface of the cable. The upper conductive clip may electrically connect the first conductive pathway and the second conductive pathway and may be configured to slide along the length of the cable. The upper conductive clip may include a projection extending outward from the cable. The lower conductive clip may be connected to the tube at a lower end of the tube, and the upper conductive clip may be connected to the tube at an upper end of the tube.

In some forms, the LED may be one of a plurality of LEDs provided on an LED sheet, the LED sheet arranged in a cylindrical configuration around the tube, each of the plurality of LEDs in electrical communication with the first conductive pathway and the second conductive pathway. The LED sheet may be connected to the lower conductive clip and to the upper conductive clip.

In some forms, the projection of the lower conductive clip may include a first prong and a second prong, and the projection of the upper conductive clip including a first prong and a second prong.

In some forms, the tube may have a first side and a second side, and the first side may be configured to removably connect to the second side.

In some forms, the tube may include a first lower aperture through which the first prong of the projection of the lower conductive clip extends, a second lower aperture through which the second prong of the projection of the lower conductive clip extends, a first upper aperture through which the first prong of the projection of the upper conductive clip extends, and a second upper aperture through which the second prong of the projection of the upper conductive clip extends.

In some forms, the tube may include an outer surface provided with a first lower niche, a second lower niche, a first upper niche, and a second upper niche. The first lower niche may be provided in the outer surface adjacent the first lower aperture and may include a first lower horizontal wall engaged by the lower conductive clip. The second lower niche may be provided in the outer surface adjacent the second lower aperture and may include a second lower horizontal wall engaged by the lower conductive clip. The first upper niche may be provided in the outer surface adjacent the first upper aperture and may include a first upper horizontal wall engaged by the upper conductive clip. The second upper niche may be provided in the outer surface adjacent the second upper aperture and may include a second upper horizontal wall engaged by the upper conductive clip.

In some forms, the first prong of the projection of the lower conductive clip may include a first lower horizontal portion positioned against and engaging the first lower horizontal wall, and the second prong of the projection of the lower conductive clip may include a second lower horizontal portion positioned against and engaging the second lower horizontal wall. The first prong of the projection of the upper conductive clip may include a first upper horizontal portion positioned against and engaging the first upper horizontal wall, and the second prong of the projection of the upper conductive clip may include a second upper horizontal portion positioned against and engaging the second upper horizontal wall.

In some forms, the LED sheet may include a first lower opening connected to the first lower horizontal portion of the first prong of the projection of the lower conductive clip, a second lower opening connected to the second lower horizontal portion of the second prong of the projection of the lower conductive clip, a first upper opening connected to the first upper horizontal portion of the first prong of the projection of the upper conductive clip, and a second upper opening connected to the second upper horizontal portion of the second prong of the projection of the upper conductive clip.

In some forms, the lower conductive clip may include a first lower catch and a second lower catch, the upper conductive clip may include a first upper catch and a second upper catch, the tube may include an interior surface, and each of the first lower catch, the second lower catch, the first upper catch, and the second upper catch may engage the interior surface of the tube.

In some forms, the interior surface of the tube may include a first lower recess adjacent a first lower aperture, the first lower recess including a first lower horizontal surface engaged by the first lower catch of the lower conductive clip. The interior surface of the tube may further include a second lower recess adjacent a second lower aperture, the second lower recess including a second lower horizontal surface engaged by the second lower catch of the lower conductive clip. The interior surface of the tube may include a first upper recess adjacent a first upper aperture, the first upper recess including a first upper horizontal surface engaged by the first upper catch of the upper conductive clip. The interior surface of the tube may include a second upper recess adjacent a second upper aperture, the second upper recess including a second upper horizontal surface engaged by the second upper catch of the upper conductive clip.

In some forms, the housing may include a light-transmissive enclosure having an outer surface, an upper fitting inserted into the light-transmissive enclosure and connected to an upper end of the tube, a lower fitting inserted into the light-transmissive enclosure and connected to a lower end of the tube, an upper cover connected to the upper fitting and positioned adjacent the outer surface of the light-transmissive enclosure, and a lower cover connected to the lower fitting and positioned adjacent the outer surface of the light-transmissive enclosure.

In some forms, the light-transmissive enclosure may include an upper opening, the upper fitting including exterior threading positioned outside the light-transmissive enclosure and threadably connected to the upper cover, a wall positioned along the upper opening, and interior threading positioned inside the light-transmissive enclosure and threadably connected to the upper end of the tube. The light-transmissive enclosure may further include a lower opening, the lower fitting including exterior threading positioned outside the light-transmissive enclosure and threadably connected to the lower cover, a wall positioned along the lower opening, and interior threading positioned inside the light-transmissive enclosure and threadably connected to the lower end of the tube.

In some forms, the light-transmissive enclosure may include an upper opening having a maximum upper distance and a lower opening having a maximum lower distance, the upper cover having a width greater than the maximum upper distance and the lower cover having a width greater than the maximum lower distance.

In some forms, the cable may have a longitudinal axis. The first conductive pathway may be arranged parallel to the longitudinal axis, and the second conductive pathway may be arranged parallel to the longitudinal axis.

In some forms, the first conductive pathway may be positioned opposite the second conductive pathway.

In some forms, a finial may be connected at one end of the cable, the finial configured to prevent the luminaire from sliding off the cable.

According to an example, a chandelier includes a mounting fixture, a wire system, a plurality of cables, a plurality of luminaires, a plurality of decorative orbs, and a plurality of cords. The wire system is positioned within the mounting fixture and configured to connect to a power source. Each cable of the plurality of cables has a length, an exterior surface, a first conductive pathway extending the length of the cable along the exterior surface, a second conductive pathway extending the length of the cable along the exterior surface, and a non-conductive material electrically isolating the first conductive pathway from the second conductive pathway. Each luminaire of the plurality of luminaires is connected to one of the plurality of cables. Each luminaire includes a conductive clip, a tube, an LED, and a housing. The conductive clip is secured at least partially around the exterior surface of the connected cable of the plurality of cables and electrically connects the first conductive pathway and the second conductive pathway. The conductive clip is configured to slide along the length of the connected cable of the plurality of cables and includes a projection extending outward from the connected cable of the plurality of cables. The tube connected is to the conductive clip and positioned around the connected cable of the plurality of cables. The projection of the conductive clip extends through the tube. The LED is coupled to the tube and connected to the projection of the conductive clip. The LED is in electrical communication with the respective first conductive pathway and the respective second conductive pathway via the conductive clip. The housing is secured to the tube around the LED and the connected cable of the plurality of cables. Each of the plurality of cords is connected to the mounting fixture, and each of the plurality of decorative orbs is slidably positioned on one of the plurality of cords.

Methods and apparatuses consistent with the systems and methods disclosed herein are capable of other arrangements and of being practiced and carried out in various ways. Also, it is to be understood that the phraseology and terminology employed herein, as well as the abstract included below, are for the purposes of description and should not be regarded as limiting.

DETAILED DESCRIPTION

The chandelier and lighting assembly disclosed herein beneficially enable a luminaire to be adjusted by sliding along a cable without interrupting the flow of power to the lighting element (e.g., an LED or sheet containing a plurality of LEDs) contained within the luminaire. Because the cable comprises a first conductive pathway and a second conductive pathway that run along a length of the cable, and the luminaire includes a conductive clip that completes the electrical circuit between the first and second conductive pathways, the power flow is maintained so long as the conductive clip is positioned along the length of the cable. The cable is able to both mechanically support the luminaire and power the luminaire, eliminating the need for an electrical wire that is separate from the supporting cord. In this way, the user is spared from either having to cut an electrical wire to a desired length (thereby limiting future adjustability of the luminaire) or hide excess electrical cord within the luminaire if the luminaire is positioned at less than a maximum length. The arrangement thereby maximizes the adjustability of the lighting assembly, simplifies the process of adjusting a luminaire to a desired height, and provides an aesthetically pleasing appearance that does not detract from the intended decorative effect of the chandelier. Moreover, the arrangement enables multiple luminaires to be positioned upon and provided with power from a single cable, providing even more opportunities for adjustments and customization of a chandelier to suit a particular environment or ambiance.

Figure 1:
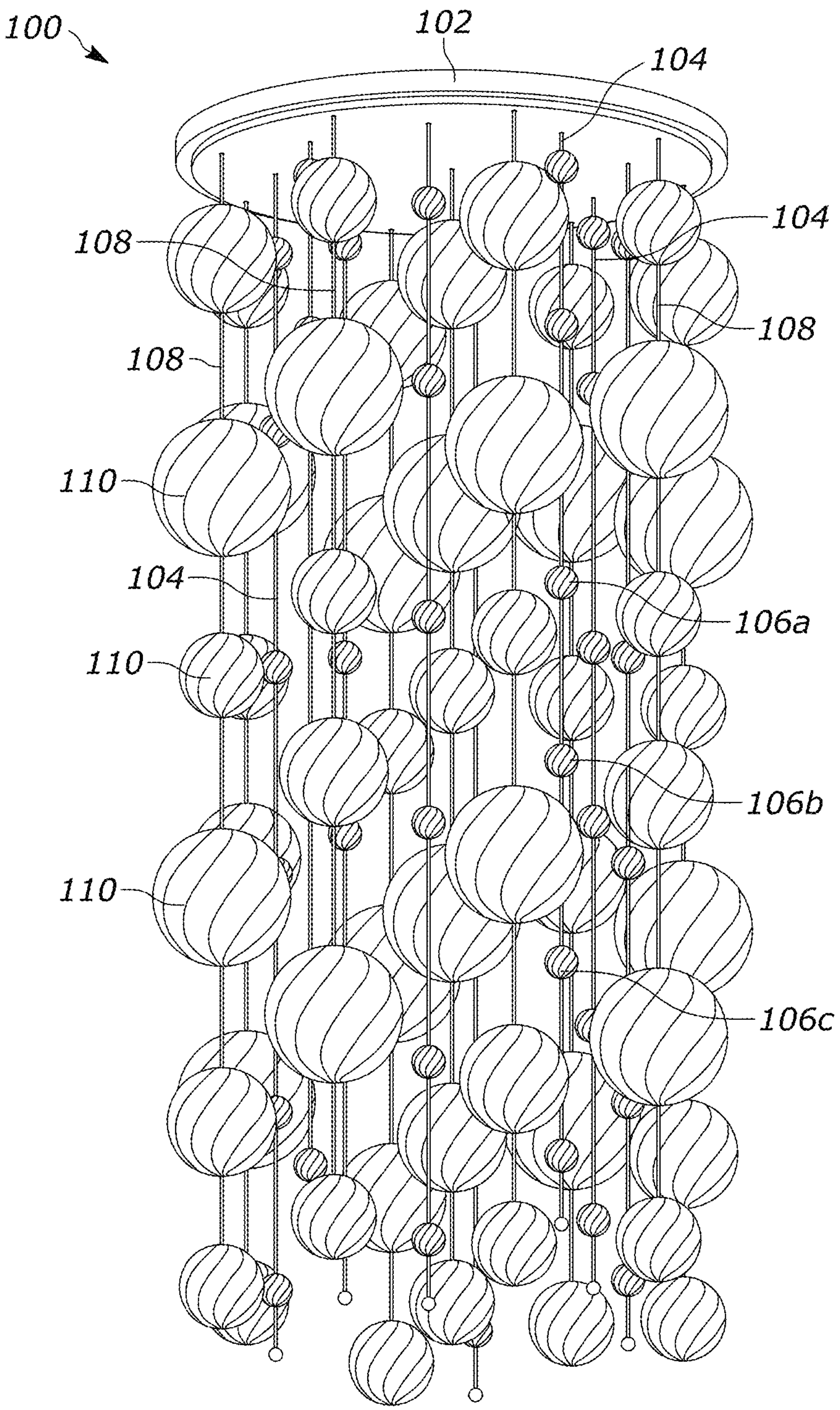
FIG. 1 is a perspective view of a chandelier according to an arrangement of the present disclosure.

FIG. 1 illustrates a chandelier 100 (which may alternatively be referred to as a lighting system) including a mounting fixture 102, a plurality of cables 104, a plurality of luminaires 106, a plurality of cords 108, and a plurality of decorative orbs 110. In the arrangement shown, each luminaire (e.g., 106*a*, 106*b*, 106*c*) of the plurality of luminaires 106 is connected to one of the plurality of cables 104 (e.g., 104*a*, 104*b*, 104*c*) that in turn is connected to the mounting fixture 102, which generally powers the plurality of luminaires 106, as will be discussed in greater detail below. In the arrangement shown, multiple luminaires 106 are provided on each cable 104. However, in other arrangements, one or more of the plurality of cables 104 may include only a single luminaire 106. The plurality of luminaires 106 are configured to produce light, and the plurality of cables 104 are configured to provide the power necessary for the production of the light. In the arrangement shown, each of the plurality of luminaires 106 has an identical aesthetic appearance. However, in other arrangements, the plurality of luminaires 106 may include luminaires 106 having any permutation of different sizes, shapes, finishes, colors, patterns, textures, or other aesthetic features. As described in further detail below, each luminaire 106 is configured to slide upon its respective cable 104 while maintaining an electrical connection adequate to produce light. Accordingly, the plurality of luminaires 106 may be adjusted between a variety of different respective distances from one another, from the mounting fixture 102, or from the plurality of decorative orbs 110. Additionally, the plurality of luminaires 106 may be slid onto or off the respective cable(s) 104 as desired.

The plurality of decorative orbs 110 are not configured to produce light but may comprise a material, shape, finish, or other feature that reflects or otherwise distributes the light produced by the plurality of luminaires 106 in a desirable manner. Each of the plurality of decorative orbs 110 is positioned upon one of the plurality of cords 108 that is connected to the mounting fixture 102. Because the decorative orbs 110 do not produce light, the plurality of cords 108 may be configured only to provide mechanical support without providing an electrical pathway. In the arrangement shown, each of the plurality of cords 108 has multiple of the plurality of decorative orbs 110 positioned thereon. However, in other arrangements, one or more of the plurality of cords 108 may include only a single decorative orb 110. In the arrangement shown, the plurality of decorative orbs 110 includes decorative orbs 110 of two different sizes, each having a similar aesthetic appearance. However, in other arrangements, the plurality of orbs 110 may include orbs 110 having any permutation of different sizes, shapes, finishes, colors, patterns, textures, or other aesthetic features. Each of the plurality of decorative orbs 110 is arranged to slide upon the respective cord 108 on which it is mounted by, for example, having the respective cord 108 extend through the decorative orb 110 and having a slidable fastener then secure the decorative orb 110 to the respective cord 108 in desired position. Accordingly, the plurality of decorative orbs 110 may be adjusted between a variety of different respective distances from one another, from the mounting fixture 102, or from the plurality of luminaires 106. Additionally, the plurality of decorative orbs 110 may be slid onto or off the respective cord(s) 108 as desired.

Figure 2:
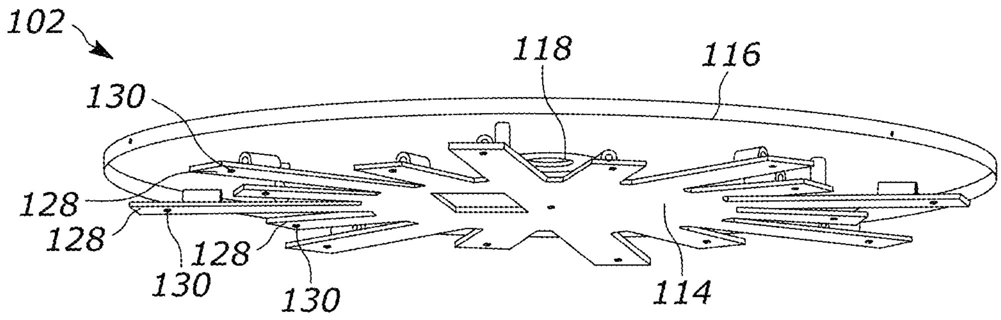
FIG. 2 is a bottom perspective view of a mounting fixture of the chandelier of FIG. 1.
Figure 3:
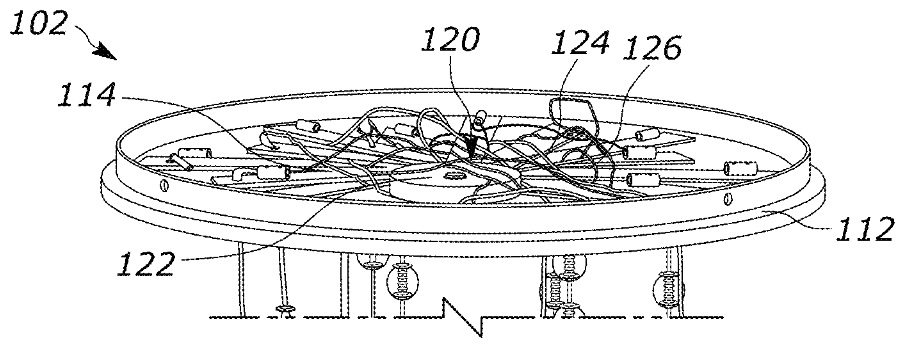
FIG. 3 is a top perspective view of a wire system of the chandelier of FIG. 1.
Figure 4:
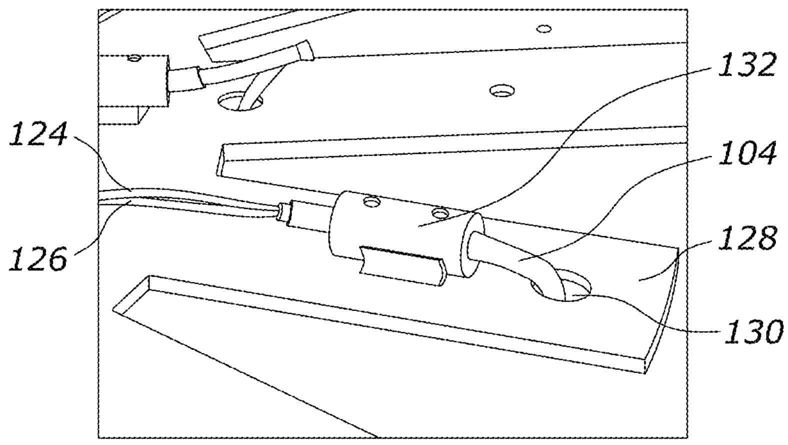
FIG. 4 is an enlarged view of the wire system of FIG. 3.

FIGS. 2-4 illustrate aspects of the mounting fixture 102. FIG. 2 illustrates the mounting fixture 102 with a canopy 112 (shown in FIG. 3) removed such that a ceiling plate 114 and mounting structure 116 is visible. The ceiling plate 114 includes openings 118 to physically connect the ceiling plate 114 to the ceiling and to provide electrical communication through the ceiling plate 114 to an electrical power source (e.g., a constant voltage driver positioned in the ceiling or the ceiling plate 114). The mounting structure 116 is connected to but offset from the ceiling plate 114 so that a wire system 120 (shown in FIG. 3) can be positioned between the ceiling plate 114 and the mounting structure 116. As shown in FIG. 3, the wire system 120 may include a hub 122 (including, for example, a controller), a plurality of wires 124 carrying positive voltage, and a plurality of wires 126 carrying negative voltage. The hub 122 may be connected to an external electrical power source (e.g., a constant voltage driver positioned in the ceiling) through, for example, the openings 118 in the ceiling plate 114, and each of the plurality of wires 124 carrying positive voltage and each of the plurality of wires 126 carrying negative voltage may be connected to the hub 122.

As best shown in FIG. 2, the mounting structure 116 may include a plurality of arms 128 and a plurality of holes 130. In the arrangement shown, each of the plurality of arms 128 is provided with a hole 130 through which a respective cable 104 is electrically connected to one of the plurality of wires 124 carrying positive voltage and one of the plurality of wires 126 carrying negative voltage. As shown in FIG. 4, an alignment conduit 132 may be provided on each arm 128 to direct the respective wire 124, the respective wire 126, and the respective cable 104 to the respective hole 130. As shown in FIG. 3, the canopy 112 may be provided to connect to the ceiling plate 114 and cover the mounting structure 116 and the wire system 120. The canopy 112 allows the mounting fixture 102 to have a clean and attractive aesthetic. The canopy 112 may include a plurality of apertures or holes that cooperate with the position of the plurality of holes 130 in the mounting structure 116 and enable the plurality of cables 104 to extend through the canopy 112.

Figure 5:
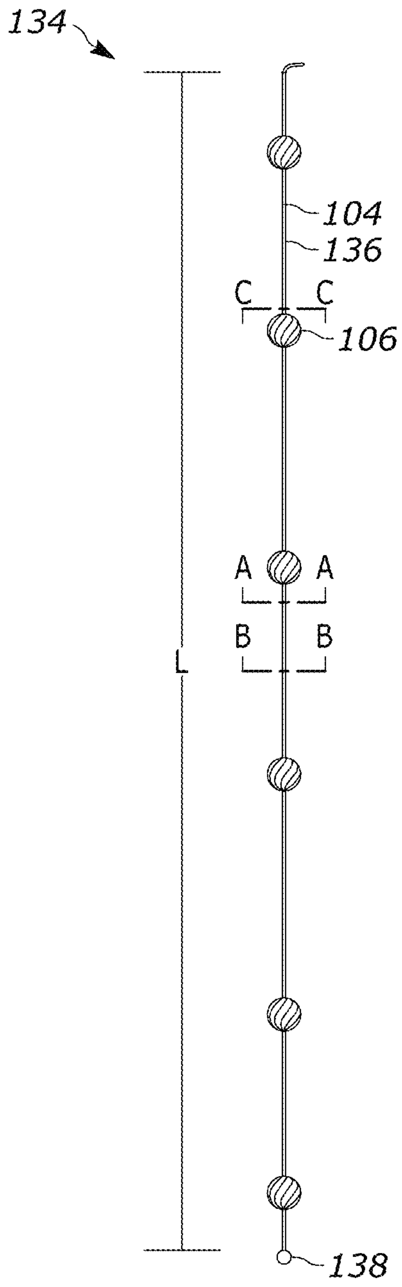
FIG. 5 is a side perspective view of a lighting assembly of the chandelier of FIG. 1.
Figure 6:
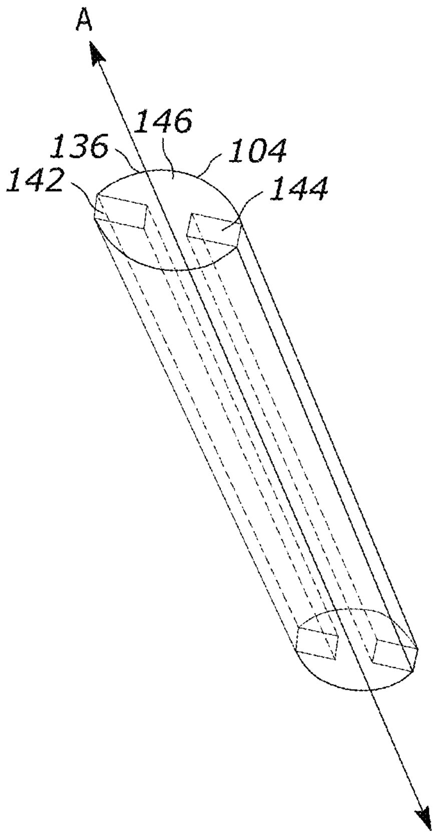
FIG. 6 is a cross-sectional view of a cable of the lighting assembly of FIG. 5 taken between lines A-A and B-B.

Turning to FIG. 5, a lighting assembly 134 of the chandelier 100 is illustrated. The lighting assembly 134 includes one of the cables 104, and the cable 104 has an exterior surface 136. A plurality of luminaires 106 are positioned upon the cable 104. A finial 138 is provided at an end 140 of the cable 104 and is configured to prevent the luminaires 106 (particularly the bottom most luminaire 106) from sliding off the cable 104. FIG. 6 illustrates a cross-sectional view of the cable 104 of FIG. 5 taken between lines A-A and B-B. As shown, the cable 104 includes a first conductive pathway 142 extending a length L of the cable 104 along the exterior surface 136 and a second conductive pathway 144 extending the length L of the cable along the exterior surface 136. The length L along which the first conductive pathway 142 and the second conductive pathway 144 extend may be the entire length of the cable 104 as shown in FIG. 5. Alternately, the length L may extend along only some of the cable 104 such that, for example, the first conductive pathway 142 and the second conductive pathway 144 terminate prior to reaching the end 140 of the cable 104. As shown in FIG. 6, a non-conductive material 146 (e.g., plastic) electrically isolates the first conductive pathway 142 from the second conductive pathway 144. The cable 104 has a longitudinal axis A, and the first conductive pathway 142 and the second conductive pathway 144 are each arranged parallel to the longitudinal axis A. In the arrangement shown in FIG. 6, the first conductive pathway 142 is positioned opposite the second conductive pathway 144.

Figure 7:
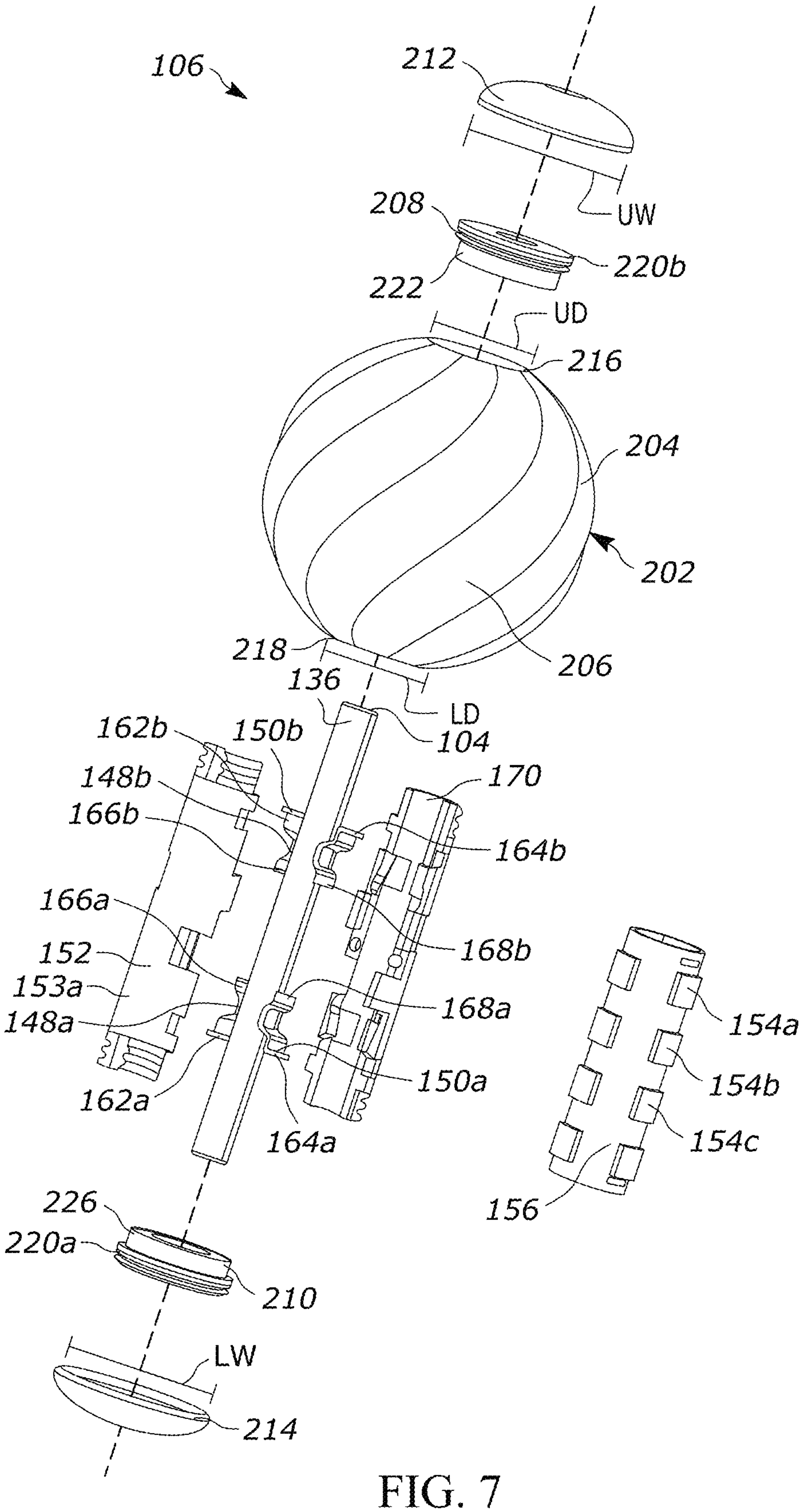
FIG. 7 is an exploded perspective view of a luminaire of the lighting assembly of FIG. 5.

As shown in FIG. 7, each luminaire 106 includes a conductive clip 148*a* that, when the luminaire 106 is positioned on a cable 104, is secured at least partially around the exterior surface 136 of the cable 104 to electrically connect the first conductive pathway 142 and the second conductive pathway 144 (shown in FIG. 6). In this way, the conductive clip 148*a* completes an electrical circuit that can then provide power to the luminaire 106. The conductive clip 148*a* also secures the luminaire 106 onto the cable 104 and is configured to slide along the length of the cable 104 when a force is exerted to move the luminaire 106.

As shown in FIG. 7, the conductive clip 148*a* includes a projection 150*a* extending outward from the cable 104. Each luminaire 106 includes a tube 152 that is connected to the conductive clip 148*a* and positioned around the cable 104, and the projection 150*a* of the conductive clip 148*a* extends through the tube 152. The tube 152 may be made from a non-conductive material so that external access to the electricity provided via the conductive clip 148*a* is limited to the projection 150*a* positioned through the tube 152, thereby limiting unintentional incidental contact with the electrical circuit. In the arrangement shown in FIG. 7, the tube 152 includes a first side 153*a* and a second side 153*b* configured to removably connect to one another via, for example, a snap fit, clasp, or other known connection mechanism. An LED 154*a* is positioned on the tube 152 and connected to the projection 150*a* such that the LED 154*a* is in electrical communication with the first conductive pathway 142 and the second conductive pathway 144 via the conductive clip 148*a*. In some arrangements, such as that shown in FIG. 7, the LED 154*a* is one of a plurality of LEDs (154*a*, 154*b*, 154*c* . . . ) provided on an LED sheet 156 for each luminaire 106. The LED sheet 156 is arranged in a cylindrical configuration around the tube 152, and each of the plurality of LEDs 154 is in electrical communication with the first conductive pathway 142 and the second conductive pathway 144 such that each of the plurality of LEDs 154 is provided with adequate electrical power to produce illumination.

In the arrangement shown in FIG. 7, the conductive clip 148*a* is a lower conductive clip connected to the tube 152 at a lower end 158 of the tube 152, and the luminaire 106 also includes an upper conductive clip 148*b* connected to the tube 152 at an upper end 160 of the tube. Like the lower conductive clip 148*a*, the upper conductive clip 148*b* is secured at least partially around the exterior surface 136 of the cable 104 and electrically connects the first conductive pathway 142 and the second conductive pathway 144. Like the lower conductive clip 148*a*, the upper conductive clip 148*b* is configured to slide along the length L of the cable 104, and the upper conductive clip 148*b* includes a projection 150*b* extending outward from the cable 104 that extends through the tube 152. In the arrangement shown in FIG. 7, the LED sheet 156 is connected to both the lower conductive clip 148*a* and the upper conductive clip 148*b*, which together provided electrical power to all of the plurality of LEDs 154. The luminaire 106 is thus configured to slide along the length L of the cable 104 while maintaining electrical communication between each of the plurality of LEDs 154 and the cable 104.

The lower conductive clip 148*a* and the upper conductive clip 148*b* are each specifically structured such that, in addition to providing power to the plurality of LEDs 154, the lower conductive clip 148 and the upper conductive clip 148*b* also securely connect to the tube 152 in a manner that ensures the tube 152 also slides when the lower conductive clip 148 and the upper conductive clip 148*b* slide. The projection 150*a* of the lower conductive clip 148*a* includes a first prong 162*a* and a second prong 164*a*, and the projection 150*b* of the upper conductive clip 148*b* includes a first prong 162*b* and a second prong 164*b*. The lower conductive clip 148*a* includes a first lower catch 166*a* and a second lower catch 168*a*, and the upper conductive clip 148*b* includes a first upper catch 166*b* and a second upper catch 168*b*. The tube 152 has an interior surface 170, and each of the first lower catch 166*a*, the first upper catch 166*b*, the second lower catch 168*a*, and the second upper catch 168*b* engage the interior surface 170 of the tube 152.

Figure 8:
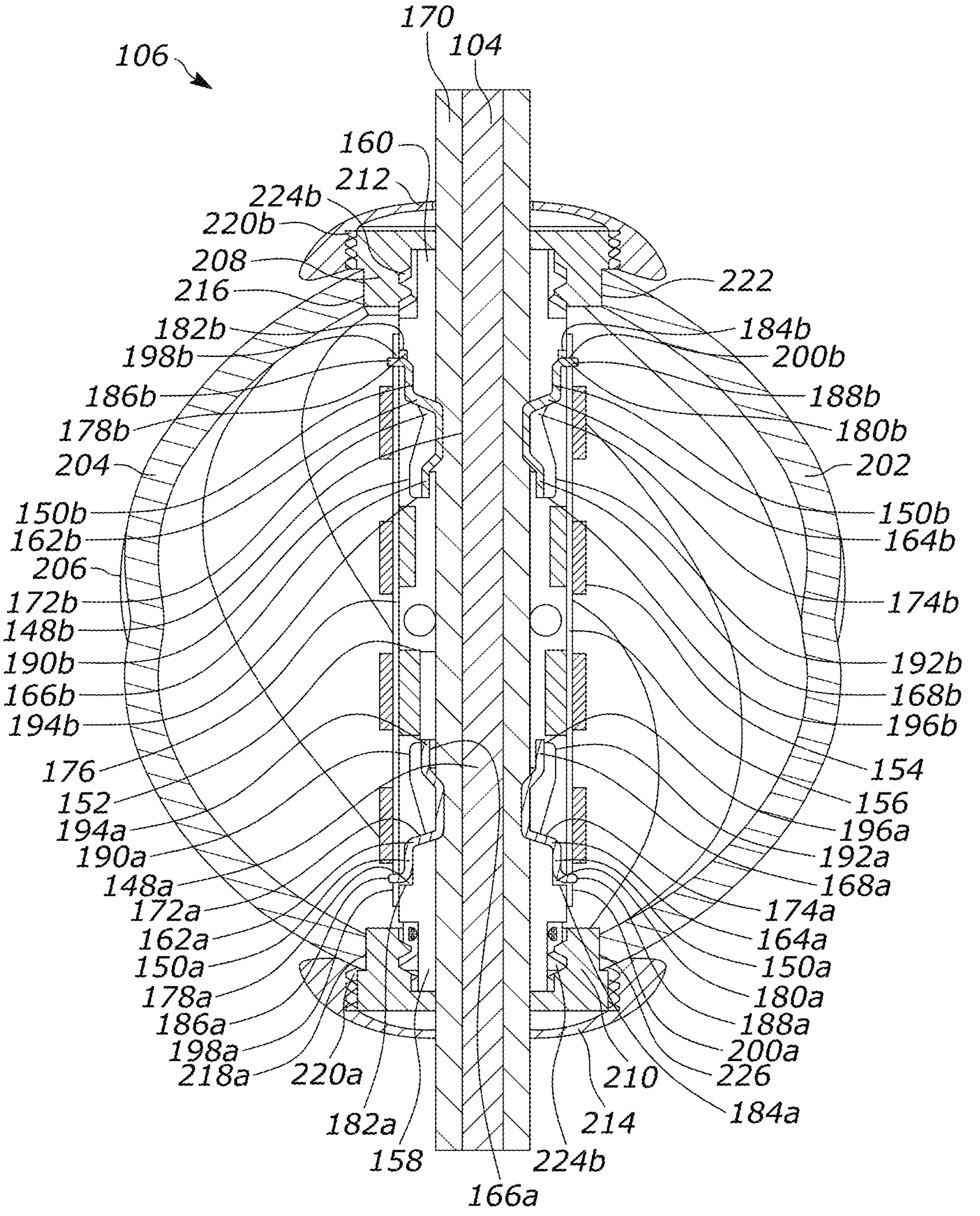
FIG. 8 is a cross-sectional view of the luminaire of the lighting assembly of FIG. 5 taken along lines C-C.

Specifically, as shown in FIG. 8, the tube 152 includes a first lower aperture 172*a* through which the first prong 162*a* of the projection 150*a* of the lower conductive clip 148*a* extends and a second lower aperture 174*a* through which the second prong 164*a* of the projection 150*a* of the lower conductive clip 148*a* extends. Likewise, the tube 152 includes a first upper aperture 172*b* through which the first prong 162*b* of the projection 150*b* of the upper conductive clip 148*b* extends, and a second upper aperture 174*b* through which the second prong 164*b* of the projection 150*b* of the upper conductive clip 148*b* extends.

The tube 152 has an outer surface 176. A first lower niche 178*a* is provided in the outer surface 176 adjacent the first lower aperture 172*a*, and a second lower niche 180*a* is provided in the outer surface 176 adjacent the second lower aperture 174*a*. The first lower niche 178*a* includes a first lower horizontal wall 182*a* engaged by the lower conductive clip 148*a*, and the second lower niche 180*a* includes a second lower horizontal wall 184*a* engaged by the lower conductive clip 148*a*. Similarly, a first upper niche 178*b* is provided in the outer surface 176 adjacent the first upper aperture 172*b*, and a second upper niche 180*b* is provided in the outer surface 176 adjacent the second upper aperture 174*b*. The first upper niche 178*b* includes a first upper horizontal wall 182*b* engaged by the upper conductive clip 148*b*, and the second upper niche 180*b* includes a second upper horizontal wall 184*b* engaged by the upper conductive clip 148*b*. More specifically, the first prong 162*a* of the projection 150*a* of the lower conductive clip 148*a* includes a first lower horizontal portion 186*a* positioned against and engaging the first lower horizontal wall 182*a*. The second prong 164*a* of the projection 150*a* of the lower conductive clip 148*a* includes a second lower horizontal portion 188*a* positioned against and engaging the second lower horizontal wall 184*a*. The first prong 162*b* of the projection 150*b* of the upper conductive clip 148*b* includes a first upper horizontal portion 186*b* positioned against and engaging the first upper horizontal wall 182*b*, and the second prong 164*b* of the projection 150*b* of the upper conductive clip 148*b* includes a second upper horizontal portion 188*b* positioned against and engaging the second upper horizontal wall 184*b*. The first upper horizontal wall 182*b* and the second upper horizontal wall 184*b* ensure that any upward movement of the upper conductive clip 148*b* or downward movement of the tube 152 is transmitted therebetween, and the first lower horizontal wall 182*a* and the second lower horizontal wall 184*a* ensure that any downward movement of the lower conductive clip 148*a* or upward movement of the tube 152 is transmitted therebetween, thereby ensuring that the tube 152, the upper conductive clip 148*b*, and the lower conductive clip 148*a* slide together.

As also shown in FIG. 8, the interior surface 170 of the tube 152 includes a first lower recess 190*a* adjacent the first lower aperture 172*a* and a second lower recess 192*a* adjacent the second lower aperture 174*a*. The first lower recess 190*a* includes a first lower horizontal surface 194*a* engaged by the first lower catch 166*a* of the lower conductive clip 148*a*. The second lower recess 192*a* includes a second lower horizontal surface 196*a* engaged by the second lower catch 168*a* of the lower conductive clip 148*a*. The interior surface 170 of the tube 152 includes a first upper recess 190*b* adjacent a first upper aperture 172*b* and a second upper recess 192*b* adjacent the second upper aperture 174*b*. The first upper recess 190*b* includes a first upper horizontal surface 194*b* engaged by the first upper catch 166*b* of the upper conductive clip 148*b*, and the second upper recess 192*b* includes a second upper horizontal surface 196*b* engaged by the second upper catch 168*b* of the upper conductive clip 148*b*. The first upper horizontal surface 194*b* and the second upper horizontal surface 196*b* ensure that any downward movement of the upper conductive clip 148*b* or upward movement of the tube 152 is transmitted therebetween, and the first lower horizontal surface 194*a* and the second lower horizontal surface 196*a* ensure that any upward movement of the lower conductive clip 148*a* or downward movement of the tube 152 is transmitted therebetween, thereby ensuring that the tube 152, the upper conductive clip 148*b*, and the lower conductive clip 148*a* slide together.

As also shown in FIG. 8, the LED sheet 156 includes a first lower opening 198*a* connected to the first lower horizontal portion 186*a* of the first prong 162*a* of the projection 150*a* of the lower conductive clip 148*a* and a second lower opening 200*a* connected to the second lower horizontal portion 188*a* of the second prong 164*a* of the projection 150*a* of the lower conductive clip 148*a*. The LED sheet 156 further includes a first upper opening 198*b* connected to the first upper horizontal portion 186*b* of the first prong 162*b* of the projection 150*b* of the upper conductive clip 148*b* and a second upper opening 200*b* connected to the second upper horizontal portion 188*b* of the second prong 164*b* of the projection 150*b* of the upper conductive clip 148*b*. These connections ensure that the LED sheet 156 slides with the tube 152, the lower conductive clip 148*a*, and the upper conductive clip 148*b* regardless of the direction of movement.

As also shown in FIGS. 7 and 8, each luminaire 106 has a housing 202 that is secured to the tube 152 around the plurality of LEDs 154 and the cable 104. The housing 202 includes a light-transmissive enclosure 204 having an outer surface 206, an upper fitting 208, a lower fitting 210, an upper cover 212, and a lower cover 214. The light-transmissive enclosure 204 is made from, for example, acrylic or glass to enable light from the plurality of LEDs 154 to be transmitted therethrough. The outer surface 206 in FIGS. 7 and 8 has a sphere-like or globe-like shape though the outer surface 206 may take any of a variety of different sizes, shapes, and textures. The upper fitting 208 is inserted into the light-transmissive enclosure 204 and connected to the upper end 160 of the tube 152. The lower fitting 210 is inserted into the light-transmissive enclosure 204 and connected to the lower end 158 of the tube 152. The upper cover 212 is connected to the upper fitting 208 and positioned adjacent the outer surface 206 of the light-transmissive enclosure 204, and the lower cover 214 is connected to the lower fitting 210 and positioned adjacent the outer surface 206 of the light-transmissive enclosure 204.

Specifically, the light-transmissive enclosure 204 includes an upper opening 216, and the upper fitting 208 includes a first upper connection mechanism 220*b* positioned outside the light-transmissive enclosure 204 and connected to the upper cover 212. In the arrangement shown, the first upper connection mechanism 220*b* takes the form of external threading such that the connection is a threaded connection, but other options, such as a snap fit or press fit, could be used instead. A wall 222 of the upper fitting 208 is positioned along the upper opening 216, and a second upper connection mechanism 224*b* is positioned inside the light-transmissive enclosure and connected to the upper end 160 of the tube 152. In the arrangement shown, the second upper connection mechanism 224*b* takes the form of interior threading such that the connection is a threaded connection, but other options, such as a snap fit or press fit, could be used instead. The light-transmissive enclosure 204 further includes a lower opening 218, the lower fitting 210 including a first lower connection mechanism 220*a* positioned outside the light-transmissive enclosure 204 and connected to the lower cover 214. In the arrangement shown, the first lower connection mechanism 220*a* takes the form of external threading such that the connection is a threaded connection, but other options, such as a snap fit or press fit, could be used instead. A wall 226 of the lower fitting 210 is positioned along the lower opening 218, and a second lower connection mechanism 224*a* is positioned inside the light-transmissive enclosure 204 and connected to the lower end 158 of the tube 152. In the arrangement shown, the second lower connection mechanism 224*a* takes the form of interior threading such that the connection is a threaded connection, but other options, such as a snap fit or press fit, could be used instead.

As shown in FIG. 7, the upper opening 216 of the light-transmissive enclosure 204 has a maximum upper distance UD, and the lower opening 218 has a maximum lower distance LD. In the arrangement shown, the upper opening 216 and the lower opening 218 are both circular so the maximum upper distance UD and the maximum lower distance LD are the respective diameters of the upper opening 216 and the lower opening 218. The upper cover 212 has a width UW greater than the maximum upper distance UD and the lower cover 214 has a width LW greater than the maximum lower distance LD. Due to these dimensions, the light-transmissive enclosure 204 is trapped between the upper cover 212 and the lower cover 214. Because the upper cover 212 and the lower cover 214 are connected with the upper fitting 208 and lower fitting 210 respectively, which are in turn connected to the tube 152, which is in turn connected to the lower conductive clip 148*a* and the upper conductive clip 148*b*, the light-transmissive enclosure 204 and entire housing 202 slides as a unit with the rest of the luminaire 106.

The following additional considerations apply to the foregoing discussion and the appended claims. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

As used in the present disclosure, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Upon reading this disclosure, those of skill in the art will appreciate still additional alternative structural and functional designs through the principles described herein. Thus, while particular implementations and applications have been illustrated and described, it is to be understood that the disclosed implementations are not limited to the precise construction and components disclosed in the present disclosure. Various modifications, changes, and variations, which will be apparent to those skilled in the art, may be made in the arrangement, operation and details of the method and apparatus disclosed in the present disclosure without departing from the spirit and scope defined in the appended claims.

What is claimed is:

1. A lighting assembly comprising:

a cable having a length, an exterior surface, a first conductive pathway extending the length of the cable along the exterior surface, a second conductive pathway extending the length of the cable along the exterior surface, and a non-conductive material electrically isolating the first conductive pathway from the second conductive pathway; and a luminaire including:

a conductive clip secured at least partially around the exterior surface of the cable, the conductive clip electrically connecting the first conductive pathway and the second conductive pathway, the conductive clip configured to slide along the length of the cable, the conductive clip including a projection extending outward from the cable;

a tube connected to the conductive clip and positioned around the cable, the projection of the conductive clip extending through the tube;

an LED coupled to the tube and connected to the projection of the conductive clip, the LED in electrical communication with the first conductive pathway and the second conductive pathway via the conductive clip; and a housing secured to the tube around the LED and the cable;

the luminaire configured to slide along the length of the cable while maintaining electrical communication between the LED and the cable.

2. The lighting assembly of claim 1, the tube being non-conductive.

3. The lighting assembly of claim 1, the LED being one of a plurality of LEDs provided on an LED sheet, the LED sheet arranged in a cylindrical configuration around the tube, each of the plurality of LEDs in electrical communication with the first conductive pathway and the second conductive pathway.

4. The lighting assembly of claim 1, the conductive clip being a lower conductive clip, the luminaire including an upper conductive clip secured at least partially around the exterior surface of the cable, the upper conductive clip electrically connecting the first conductive pathway and the second conductive pathway, the upper conductive clip configured to slide along the length of the cable, the upper conductive clip including a projection extending outward from the cable and the projection of the upper conductive clip extending through the tube, and the LED connected to the projection of the upper conductive clip, the lower conductive clip connected to the tube at a lower end of the tube, the upper conductive clip connected to the tube at an upper end of the tube.

5. The lighting assembly of claim 4, the LED being one of a plurality of LEDs provided on an LED sheet, the LED sheet arranged in a cylindrical configuration around the tube, each of the plurality of LEDs in electrical communication with the first conductive pathway and the second conductive pathway, the LED sheet connected to the lower conductive clip and to the upper conductive clip.

6. The lighting assembly of claim 5, the projection of the lower conductive clip including a first prong and a second prong, the projection of the upper conductive clip including a first prong and a second prong.

7. The lighting assembly of claim 6, the tube including a first lower aperture through which the first prong of the projection of the lower conductive clip extends, a second lower aperture through which the second prong of the projection of the lower conductive clip extends, a first upper aperture through which the first prong of the projection of the upper conductive clip extends, and a second upper aperture through which the second prong of the projection of the upper conductive clip extends.

8. The lighting assembly of claim 7, the tube including an outer surface, a first lower niche provided in the outer surface adjacent the first lower aperture, the first lower niche including a first lower horizontal wall engaged by the lower conductive clip, a second lower niche provided in the outer surface adjacent the second lower aperture, the second lower niche including a second lower horizontal wall engaged by the lower conductive clip, a first upper niche provided in the outer surface adjacent the first upper aperture, the first upper niche including a first upper horizontal wall engaged by the upper conductive clip, a second upper niche provided in the outer surface adjacent the second upper aperture, the second upper niche including a second upper horizontal wall engaged by the upper conductive clip.

9. The lighting assembly of claim 8, the first prong of the projection of the lower conductive clip includes a first lower horizontal portion positioned against and engaging the first lower horizontal wall, the second prong of the projection of the lower conductive clip includes a second lower horizontal portion positioned against and engaging the second lower horizontal wall, the first prong of the projection of the upper conductive clip including a first upper horizontal portion positioned against and engaging the first upper horizontal wall, and the second prong of the projection of the upper conductive clip includes a second upper horizontal portion positioned against and engaging the second upper horizontal wall.

10. The lighting assembly of claim 9, the LED sheet including a first lower opening connected to the first lower horizontal portion of the first prong of the projection of the lower conductive clip, a second lower opening connected to the second lower horizontal portion of the second prong of the projection of the lower conductive clip, a first upper opening connected to the first upper horizontal portion of the first prong of the projection of the upper conductive clip, and a second upper opening connected to the second upper horizontal portion of the second prong of the projection of the upper conductive clip.

11. The lighting assembly of claim 7, the lower conductive clip including a first lower catch and a second lower catch, the upper conductive clip including a first upper catch and a second upper catch, the tube including an interior surface, and each of the first lower catch, the second lower catch, the first upper catch, and the second upper catch engaging the interior surface of the tube.

12. The lighting assembly of claim 11, the interior surface of the tube including a first lower recess adjacent a first lower aperture, the first lower recess including a first lower horizontal surface engaged by the first lower catch of the lower conductive clip, the interior surface of the tube further including a second lower recess adjacent a second lower aperture, the second lower recess including a second lower horizontal surface engaged by the second lower catch of the lower conductive clip, the interior surface of the tube including a first upper recess adjacent a first upper aperture, the first upper recess including a first upper horizontal surface engaged by the first upper catch of the upper conductive clip, and the interior surface of the tube including a second upper recess adjacent a second upper aperture, the second upper recess including a second upper horizontal surface engaged by the second upper catch of the upper conductive clip.

13. The lighting assembly of claim 1, the tube comprising a first side and a second side, the first side configured to removably connect to the second side.

14. The lighting assembly of claim 1, the housing comprising a light-transmissive enclosure having an outer surface, an upper fitting inserted into the light-transmissive enclosure and connected to an upper end of the tube, a lower fitting inserted into the light-transmissive enclosure and connected to a lower end of the tube, an upper cover connected to the upper fitting and positioned adjacent the outer surface of the light-transmissive enclosure, and a lower cover connected to the lower fitting and positioned adjacent the outer surface of the light-transmissive enclosure.

15. The lighting assembly of claim 14, the light-transmissive enclosure including an upper opening, the upper fitting including exterior threading positioned outside the light-transmissive enclosure and threadably connected to the upper cover, a wall positioned along the upper opening, and interior threading positioned inside the light-transmissive enclosure and threadably connected to the upper end of the tube, the light-transmissive enclosure further including a lower opening, the lower fitting including exterior threading positioned outside the light-transmissive enclosure and threadably connected to the lower cover, a wall positioned along the lower opening, and interior threading positioned inside the light-transmissive enclosure and threadably connected to the lower end of the tube.

16. The lighting assembly of claim 14, the light-transmissive enclosure including an upper opening having a maximum upper distance and a lower opening having a maximum lower distance, the upper cover having a width greater than the maximum upper distance and the lower cover having a width greater than the maximum lower distance.

17. The lighting assembly of claim 1, the cable having a longitudinal axis, the first conductive pathway arranged parallel to the longitudinal axis, and the second conductive pathway arranged parallel to the longitudinal axis.

18. The lighting assembly of claim 1, the first conductive pathway positioned opposite the second conductive pathway.

19. The lighting assembly of claim 1 further comprising a finial connected at one end of the cable, the finial configured to prevent the luminaire from sliding off the cable.

20. A chandelier comprising:

a mounting fixture;

a wire system positioned within the mounting fixture, the wire system configured to connect to a power source;

a plurality of cables, each cable having a length, an exterior surface, a first conductive pathway extending the length of each cable along the exterior surface, a second conductive pathway extending the length of each cable along the exterior surface, and a non-conductive material electrically isolating the first conductive pathway from the second conductive pathway;

a plurality of luminaires, each luminaire connected to one of the plurality of cables, each luminaire including:

a conductive clip secured at least partially around the exterior surface of the connected cable of the plurality of cables, the conductive clip electrically connecting the first conductive pathway and the second conductive pathway, the conductive clip configured to slide along the length of the connected cable of the plurality of cables, the conductive clip including a projection extending outward from the connected cable of the plurality of cables;

a tube connected to the conductive clip and positioned around the connected cable of the plurality of cables, the projection of the conductive clip extending through the tube;

an LED coupled to the tube and connected to the projection of the conductive clip, the LED in electrical communication with the respective first conductive pathway and the respective second conductive pathway via the conductive clip;

a housing secured to the tube around the LED and the connected cable of the plurality of cables; and a plurality of decorative orbs and a plurality of cords, each of the plurality of cords connected to the mounting fixture, each of the plurality of decorative orbs slidably positioned on one of the plurality of cords.

* * * * *